UNITED STATES PATENT OFFICE.

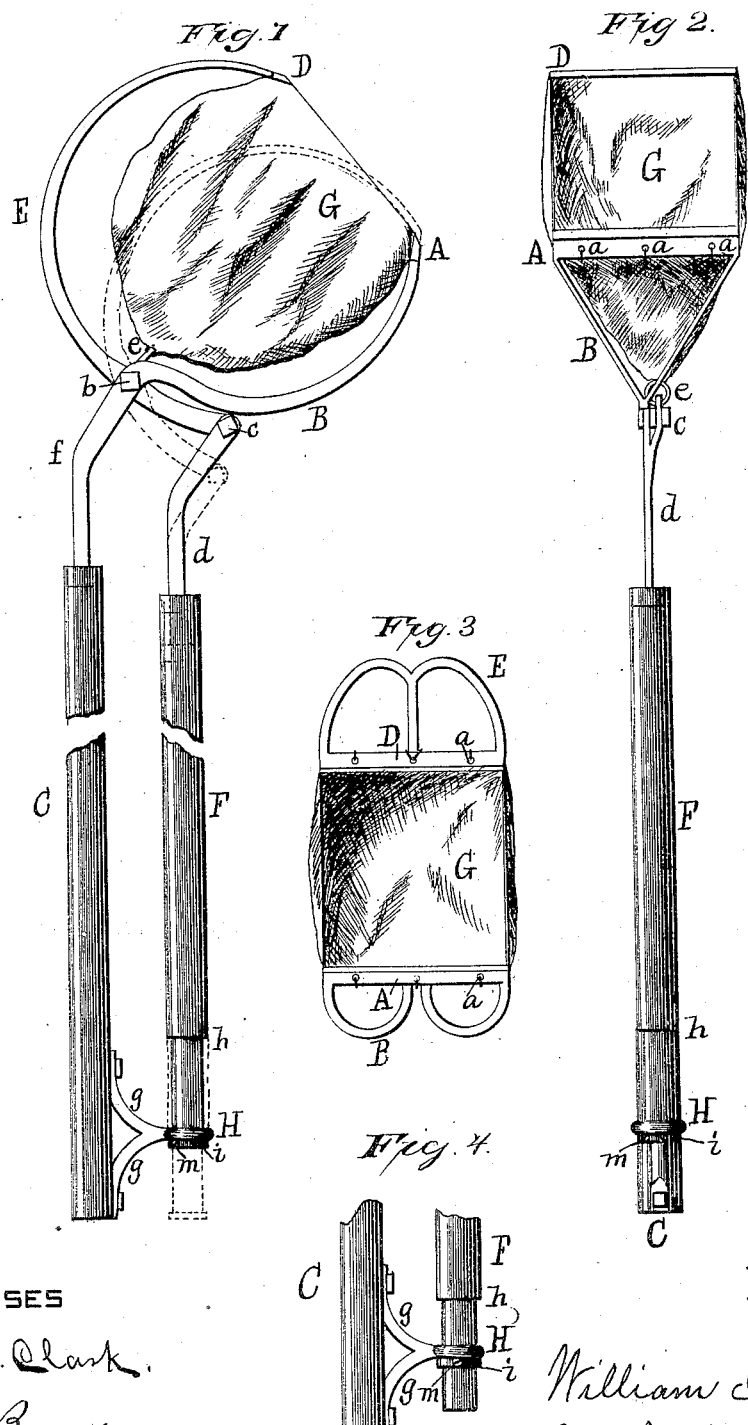

WILLIAM T. CASE, OF FELTON, DELAWARE.

FRUIT-GATHERER.

SPECIFICATION forming part of Letters Patent No. 309,521, dated December 23, 1884.

Application filed February 9, 1884. (No model.)

*To all whom it may concern:*

Be it known that I, WILLIAM T. CASE, a citizen of the United States, residing at Felton, in the county of Kent and State of Delaware, have invented certain new and useful Improvements in Fruit-Gatherers and Limb-Shakers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a side view of my improved fruit-gatherer. Fig. 2 is a front view of the same. Fig. 3 is a top view thereof, and Fig. 4 is a view of the lower ends of the handles detached.

Like letters designate corresponding parts in all of the figures.

My invention consists in a fruit-gatherer adapted also to be used as a limb-shaker, and having the peculiarities of construction hereinafter set forth.

The instrument is constructed with the following parts: a transverse knife, A, secured to a forked jaw, B, which projects from the upper end of a handle, C, another transverse knife, D, secured to a forked jaw, E, which is pivoted to the other jaw B, in its middle part, and is pivoted at the lower end to the upper end of another handle, F, and a small bag, G, suspended from the back edges of the two knives, between the jaws which hold the knives. The knives A D have small holes $a$ $a$ at short distances apart, as a means of attaching thereto the upper edges of the bag G. The forked jaws B E are properly made of metal, and the jaw B is provided with a tang for insertion into the end of its light handle C, while the jaw E is pivoted at $b$ to the jaw B, crossing the same, and is pivoted at $c$ to a metallic neck, $d$, which is provided with a tang for insertion into the other light wooden handle, F. The handles C F are to be as long as required for reaching the fruit on the limbs of the trees—say eight or ten feet, more or less. The knives are brought together for cutting off the stems of the fruit, and the jaws carrying the knives are opened for admitting the fruit by drawing down and pushing up in turn the handle F, by the side of the handle C, which may be termed the "stationary handle," the mode of operation being evident from the construction shown in the drawings. The receptacle G is suspended solely from the knives A D, so that it is held entirely out of contact with the jaws B E, and its bottom is held in position by a stay, $e$, so that it can neither swing laterally into contact with either jaw, nor can it fall out of place when the instrument is turned downward for gathering fruit from the top of a limb, or for discharging fruit. This is a very important feature of my invention, since by this construction there is no possibility of bruising the fruit when it drops into the receptacle, this being an essential desideratum in gathering choice fruit. If the bag were allowed in any way to come in contact with the jaws or any hard part of the instrument, the fruit would be liable to become bruised. This construction of the bag also protects the fruit from any liability to become bruised in discharging. When the instrument is turned downward for that purpose, the fruit gently rolls in the bag over upon the knives, so that when the knives are separated the fruit rests upon the ground or receptacle without falling any distance whatever. This construction of the transverse knives A D at the extremities of the forked jaws B E, and the bag G, suspended between the jaws from the knives alone, also enables me to use the instrument for shaking the limbs of fruit-trees to shake off the inferior fruit after the choice or fancy fruit has been picked off. For this purpose the knives are simply clamped around a limb so that the limb is held between the knives on one side and the free parts of the upper edge of the bag between the knives on the other side. Thus a very simple construction, without any change from the construction desired for the main purpose of the invention, enables me to use the instrument for this additional purpose. The stationary jaw B is bent, as at $f$, so as to turn the jaw in a lateral direction, substantially as shown in Fig. 1, whereby the knives have such a position that they can be brought conveniently to a limb from any direction, either above, beneath, or at one side, and in giving a corresponding bend to the neck $d$ of the movable handle E, so that the two handles are brought into substantially parallel positions at a little distance apart, sufficient to grasp them separately along their entire length, as shown in Fig. 1, whereby one can hold the handles at the upper ends, at the lower ends, or anywhere between the ends, as occasion may require, and may operate the instrument with equal facility in whatever part the handles may be held. When thus arranged, the two handles, being of small diameter, may be grasped together with one hand and the instrument be readily carried thus. I also employ a ring-guide, H, which is attached, by arms $g$ $g$ or other suitable means, to the stationary handle C, near its lower end, through which ring the movable handle F extends near its lower end, and in which the said handle slides up and down in operating the jaws and knives of the instrument. The full lines in Fig. 1 show the position of this handle when the jaws are open, and the dotted lines show its position when the jaws are closed. The movable handle is thus held only by this ring at the lower end, and by its pivot-connection with the movable jaw E at its upper end, so that the two handles are free to be grasped in any part, and are held always in the proper relative positions. The instrument is more firmly and with less effort held and operated by thus having two handles to be grasped respectively by the two hands.

On the movable handle F there is a stop, preferably consisting of a shoulder or enlargement, $h$, of the handle, as shown, so that when the shoulder strikes the upper side of the guide H the handle cannot descend any farther. The position of the shoulder is such that it strikes the ring-guide when the knives come together. Now, a suitable stop on the handle F, below the guide H, will limit the opening of the jaws and the separation of the knives to admit the fruit between them. This stop, which is represented in the drawings as a ring, $i$, surrounding the handle, is made adjustable up and down on the handle, being secured in any desired position by a screw, $m$, or any other suitable means. In Figs. 1 and 2 this stop $i$ is shown as secured to the extreme lower end of the handle, and this position of the stop gives the greatest extent of the opening of the jaws and the separation of the knives. This is for the largest fruit. By the construction shown a movement of the handle F an inch and a half between the guide-limits allows the knives on the jaws to be separated four and a half inches, sufficient for the largest fruit. In Fig. 4 the stop $i$ is shown adjusted some distance up from the end, thereby lessening the width of opening between the knives proportionally. This is suitable for smaller fruit, the purpose being not to open the jaws unnecessarily for small fruit, requiring thereby somewhat less labor than if the jaws were always opened as far as necessary for the largest fruit.

I claim as my invention—

1. A fruit-gatherer having transverse cutting-knives A and D, mounted on curved jaws B and E, and provided with a receiving-bag, G, which is suspended from the said cutting-knives between the jaws B and E, and is held out of contact with the said jaws, substantially as set forth, whereby the fruit in said bag is not permitted to come in contact with the jaws, and is thus preserved from injury.

2. The combination of two transverse cutting-knives, A and D, the curved jaws B and E, upon which said knives are mounted, and a bag, G, attached to the said knives at opposite points of the upper edge of said bag, and leaving intermediate portions of the upper edge of the bag between the ends of the opposite knives free, substantially as set forth, whereby the instrument is adapted to serve the purpose of a limb-shaker, as set forth.

In testimony whereof I affix my signature in presence of two witnesses.

WILLIAM T. CASE.

Witnesses:
J. S. BROWN,
A. S BROWN.